(12) United States Patent
Farnsworth

(10) Patent No.: US 8,145,374 B2
(45) Date of Patent: Mar. 27, 2012

(54) METHODS AND SYSTEMS FOR DYNAMICALLY CONTROLLING HILL ROLLBACK OF AN ELECTRIC VEHICLE

(75) Inventor: Jared Michael Farnsworth, Sacramento, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 912 days.

(21) Appl. No.: 12/128,186

(22) Filed: May 28, 2008

(65) Prior Publication Data

US 2009/0299557 A1    Dec. 3, 2009

(51) Int. Cl.
*B60W 10/18* (2012.01)
(52) U.S. Cl. ............... 701/22; 180/65.285; 903/947
(58) Field of Classification Search ............ 701/22; 180/65.285
See application file for complete search history.

(56) References Cited

U.S. PATENT DOCUMENTS

| | | | | |
|---|---|---|---|---|
| 3,684,049 | A * | 8/1972 | Kimura ................ 180/282 |
| 4,777,420 | A | 10/1988 | Dadpey et al. | |
| 5,040,088 | A | 8/1991 | Harrington et al. | |
| 5,057,760 | A | 10/1991 | Dadpey et al. | |
| 5,376,869 | A * | 12/1994 | Konrad ................ 318/587 |
| 6,321,144 | B1 * | 11/2001 | Crombez ............... 701/22 |
| 6,375,596 | B1 | 4/2002 | Steeby | |
| 6,527,076 | B1 * | 3/2003 | Polzin .................. 180/170 |
| 6,541,938 | B2 * | 4/2003 | Okamura et al. ........ 318/778 |
| 6,953,415 | B2 * | 10/2005 | Kadota ................. 477/5 |
| 7,032,697 | B2 | 4/2006 | Lee | |
| 7,151,355 | B2 * | 12/2006 | Izumi et al. ............ 318/801 |
| 7,600,827 | B2 * | 10/2009 | Tamai et al. ........... 303/191 |
| 7,806,802 | B2 * | 10/2010 | Silveri et al. ........... 477/5 |
| 7,828,694 | B2 * | 11/2010 | Silveri et al. ........... 477/3 |
| 2002/0007241 | A1 * | 1/2002 | Kupper et al. ........... 701/51 |
| 2003/0132664 | A1 * | 7/2003 | Grand et al. ............ 303/20 |
| 2004/0040760 | A1 * | 3/2004 | Kadota ................. 180/65.2 |
| 2004/0239270 | A1 | 12/2004 | Sarraillon et al. | |
| 2005/0017580 | A1 * | 1/2005 | Cikanek et al. .......... 303/191 |
| 2005/0143877 | A1 * | 6/2005 | Cikanek et al. .......... 701/22 |
| 2005/0211478 | A1 * | 9/2005 | Sakuma et al. .......... 180/65.1 |
| 2005/0246081 | A1 * | 11/2005 | Bonnet et al. ........... 701/38 |
| 2006/0111823 | A1 * | 5/2006 | Tamai ................. 701/38 |
| 2006/0220608 | A1 * | 10/2006 | Izumi et al. ............ 318/801 |
| 2007/0073466 | A1 * | 3/2007 | Tamai et al. ........... 701/70 |
| 2007/0191181 | A1 * | 8/2007 | Burns ................. 477/40 |
| 2008/0190680 | A1 * | 8/2008 | Kaneko et al. .......... 180/170 |
| 2009/0062061 | A1 * | 3/2009 | Silveri et al. ........... 477/5 |

* cited by examiner

*Primary Examiner* — Mark Hellner
*Assistant Examiner* — Ari M. Diacou
(74) *Attorney, Agent, or Firm* — Dinsmore & Shohl LLP

(57) ABSTRACT

A method for dynamically controlling rollback in an electric vehicle having a motor for providing motive power to the electric vehicle and a shift lever for selecting either forward or reverse motion of the vehicle includes determining if the electric vehicle is moving in a direction opposite the direction of motion indicated by the shift lever. If the vehicle is moving in a direction opposite the direction indicated by the shift lever, the rollback acceleration of the vehicle is calculated. A power request for driving the electric motor is then determined such that the rollback of the vehicle is controlled. The determined power request is then applied to the electric motor thereby driving the electric motor and dynamically controlling the rollback.

19 Claims, 4 Drawing Sheets

METHODS AND SYSTEMS FOR DYNAMICALLY CONTROLLING HILL ROLLBACK OF AN ELECTRIC VEHICLE

TECHNICAL FIELD

The present invention generally relates to control logic for electric vehicles and, more specifically, to methods for dynamically controlling hill rollback in an electric vehicle.

BACKGROUND

Electric vehicles may comprise one or more electric motors that provide motive power to the vehicle in place of a conventional engine, such as a gasoline or diesel engine. One difference between electric vehicles and conventionally powered vehicles is that the electric motor of the electric vehicle does not "idle" when the vehicle is at rest. Instead, the electric motor is either on, such as when the motor is providing motive power to the vehicle, or off, such as when the vehicle is at rest. This operational characteristic of the electric motor can result in uncontrolled rollback (or roll forward on a downhill). For example, rollback may occur when an electric vehicle starts up an incline from a stopped position on the incline. After the driver releases the brake pedal (but before the driver depresses the accelerator pedal) the vehicle may begin to rollback, down the incline. Uncontrolled rollback may cause driver panic and hazardous driving conditions for the driver of the electric vehicle as well as other drivers.

Some systems for mitigating and/or preventing uncontrolled rollback may utilize regenerative braking to prevent the vehicle from rolling opposite the intended direction of travel. Regenerative braking uses the electric motor of the vehicle to produce electric power from the kinetic energy of the vehicle, thereby braking the vehicle. However, at slow speeds or when the vehicle is starting from rest, the vehicle may have very little kinetic energy and the amount of braking that can be generated by regenerative braking may be insufficient to prevent uncontrolled rollback.

Other techniques to control or prevent vehicle rollback include detecting when rollback occurs and driving the motor of the electric vehicle with sufficient power to prevent the rollback. However, in determining the power to apply to the electric motor to prevent rollback, such techniques do not take into account the rollback acceleration of the vehicle or, more particularly, the differences in vehicle rollback acceleration that may be caused by inclines having different grades.

Accordingly, a need exists for a method and system that can dynamically control the rollback acceleration of an electric vehicle to maintain a desired vehicle speed versus rollback distance regardless of incline, slope and the like.

SUMMARY

In one embodiment, a method for dynamically controlling rollback in an electric vehicle having an electric motor to provide motive power to the electric vehicle and a shift lever for selecting either forward or reverse motion of the vehicle may include determining if a rollback condition exists. If a rollback condition exists, a rollback acceleration may be determined. A power request may then be determined such that the rollback of the vehicle is dynamically controlled. The power request may then be used to drive the electric motor.

In another embodiment, a method for dynamically controlling rollback in an electric vehicle having an electric motor for providing motive power to the vehicle, an accelerator pedal for providing a driver power request, and a shift lever for selecting the direction of motion of the vehicle may include determining if the electric vehicle is moving in the same direction as the direction indicated by the position of the shift lever. If the vehicle is moving in a direction opposite the direction of motion indicated by the shift lever, a rollback acceleration may be calculated. A rollback power assist may then be determined to dynamically control the rollback of the vehicle. A driver power request may also be determined based on the position of the accelerator pedal. The electric motor may then be driven using the greater of the rollback assist power request and the driver power request.

In another embodiment, a system for dynamically controlling rollback of an electric vehicle having an electric motor for providing motive power to the vehicle, an accelerator pedal for providing a driver power request, and a shift lever for selecting the direction of motion of the vehicle may include a motor speed/position sensor operatively connected to the electric motor. The motor speed/position sensor may output a signal indicative of the speed and/or position of the motor. The system may also include an accelerator pedal position sensor operatively connect to the accelerator pedal and a shift lever position sensor operatively connected to the shift lever. Each of the motor speed/position sensor, the accelerator position sensor, and the shift lever position sensor may also be operatively connected to a controller or electronic control unit (ECU) such that the controller receives signals from each sensor. The controller may also be operatively connected to the electric motor. The controller may be programmed to cooperate with the motor speed/position sensor to determine if rollback is occurring, cooperate with the motor speed/position sensor to determine a rollback acceleration for the vehicle, determine a rollback assist power request for the electric motor to control the rollback acceleration and cooperate with the accelerator pedal position sensor to determine a driver power request. The control may also be programmed to drive the electric motor with the greater of the rollback assist power request and the driver power request thereby dynamically controlling the rollback.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE ILLUSTRATIVE EMBODIMENTS

Figure 1:
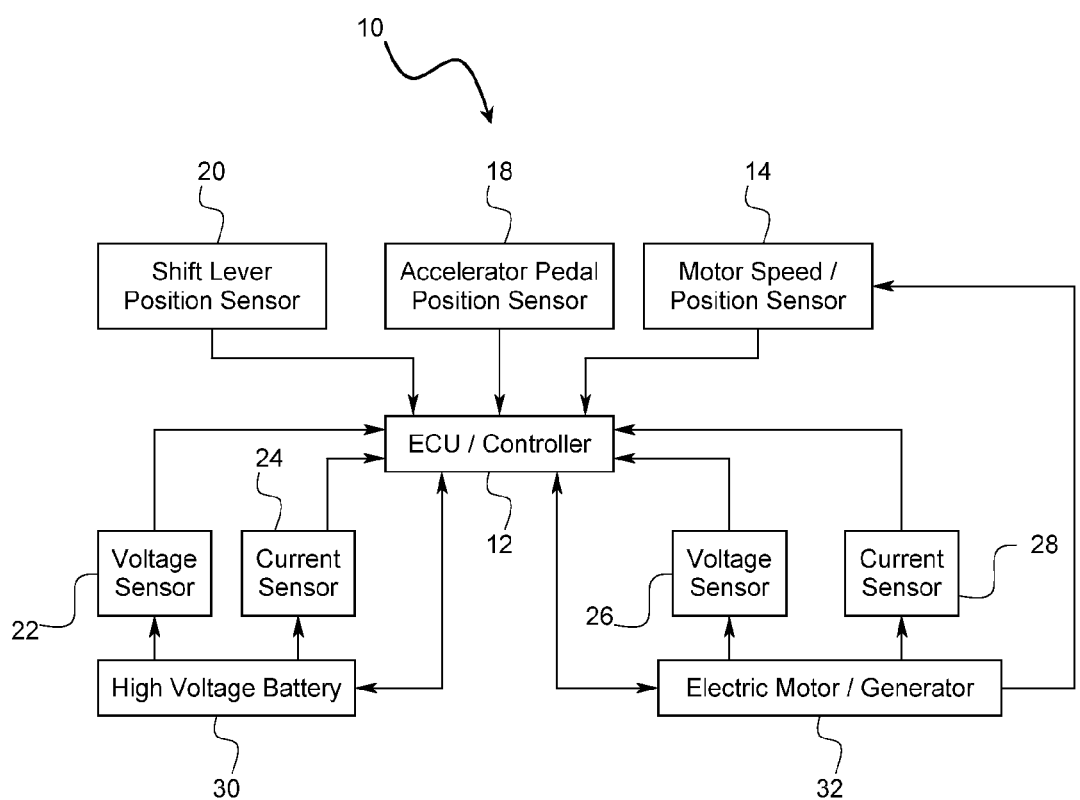
FIG. 1 depicts a schematic diagram of a system for controlling hill rollback of an electric vehicle according to one embodiment described herein.

FIG. 1 generally depicts a system for carrying out the method of dynamically controlling hill rollback in an electric vehicle according to one embodiment described herein. The system and method dynamically control hill rollback by automatically applying a power request to the electric motor to control rollback when a rollback condition is detected. The system for controlling hill rollback in an electric vehicle may generally comprise a controller or electronic control unit (ECU), an electric motor/generator, a high voltage battery, a motor speed and/or position sensor, an accelerator position sensor, and a shift lever position sensor. Each of these elements and the operation of the system will be described in more detail herein.

Referring now to FIG. 1, an embodiment of a system 10 for controlling hill rollback in an electric vehicle is shown. The system may include a stand-alone logic controller such as an electronic control unit (ECU) 12 or similar controller. In one embodiment, the ECU 12 may consist of a plurality of discrete controllers interconnected with one another. In another embodiment, the ECU 12 may be integral with another controller or a control unit. The ECU 12 may be operatively connected to a motor speed/position sensor 14 which is, in turn, operatively connected to the electric motor (discussed further herein) of the vehicle and configured to detect a speed, position, and/or direction of rotation of the electric motor.

The ECU 12 may also be operatively connected to an accelerator position sensor 18 which is, in turn, connected to the accelerator pedal of the electric vehicle. The accelerator position sensor 18 detects a position of the accelerator pedal and provides a signal to the ECU 12 indicative of this position. Based on the position of the accelerator pedal, the ECU 12 determines a driver power request and drives the electric motor utilizing the driver power request to provide motive power to the vehicle.

A shift lever position sensor 20 may also be operatively connected to the ECU 12 and the vehicle shift lever. The shift lever (not shown) may be used by the driver of the electric vehicle to control the forward and reverse motion of the electric vehicle. The shift lever may comprise two or more positions. In one embodiment, the shift lever may be positioned in park (P), reverse (R), neutral (N), or drive (D). In another embodiment, the shift lever may also be positioned in low (L) or first gear (1), second gear, (2) or third gear (3) or similar shift lever position designations for propelling the vehicle in a forward direction. The shift lever position sensor 20 provides a signal to the ECU 12 indicative of the position of the shift lever and, accordingly, the intended forward or reverse direction of motion of the vehicle.

The ECU 12 may also be electrically connected to a high voltage battery 30 or a similar energy storage device such as a capacitor bank, or the like. A voltage sensor 22 and current sensor 24 may be electronically connected to the high voltage battery 30 and operatively connected to the ECU 12 such that the voltage and current of the high voltage battery 30 are transmitted to the ECU 12. The ECU 12 may receive signals from each of the voltage sensor 22 and current sensor 24. The ECU 12 may also control the charging and discharging of the high voltage battery 30.

The ECU 12 may also be electrically connected to an electric motor/generator 32 which may be, in turn, mechanically connected to the transmission of the vehicle (not shown) such that the motor provides motive power to the vehicle by the application of torque to the wheel(s) (not shown) of the vehicle. A voltage sensor 26 and current sensor 28 may be electronically connected to the electric motor/generator 32 and operatively connected to the ECU 12 such that the voltage and current of the high voltage battery 30 are transmitted to the ECU 12 via signals from each of the voltage sensor 26 and current sensor 28. The electric motor/generator 32 may perform multiple functions under the control of the ECU 12. In one respect, the electric motor/generator 32 provides the motive force for the vehicle. In another respect, the electric motor/generator 32 may utilize the kinetic energy of the vehicle, specifically the motion of the wheels of the vehicle, to generate electricity which, in turn, is stored in the high voltage battery 30. In still another respect, the electric motor/generator 32 and the high voltage battery 30, together, form a regenerative braking system which may be used to assist vehicle braking.

It should be understood that the arrows showing the interconnectivity of the various components of the system 10 in FIG. 1 are also indicative of signals relayed to and from the ECU 12 by the various components of the system 10.

In the embodiment of the system 10 for dynamically controlling rollback in an electric vehicle depicted in FIG. 1, the ECU 12 may be programmed to determine if a rollback condition exists based on signals received from the motor speed/position sensor 14 and the shift lever position sensor 20. When the ECU 12 determines that a rollback condition exists, the ECU 12 may determine and selectively apply a power request to the electric motor 32 thereby driving the electric motor 32 to dynamically control rollback. The method used by the ECU 12 to control and prevent vehicle rollback, and alternatives thereof, will now be described in further detail.

Figure 2:
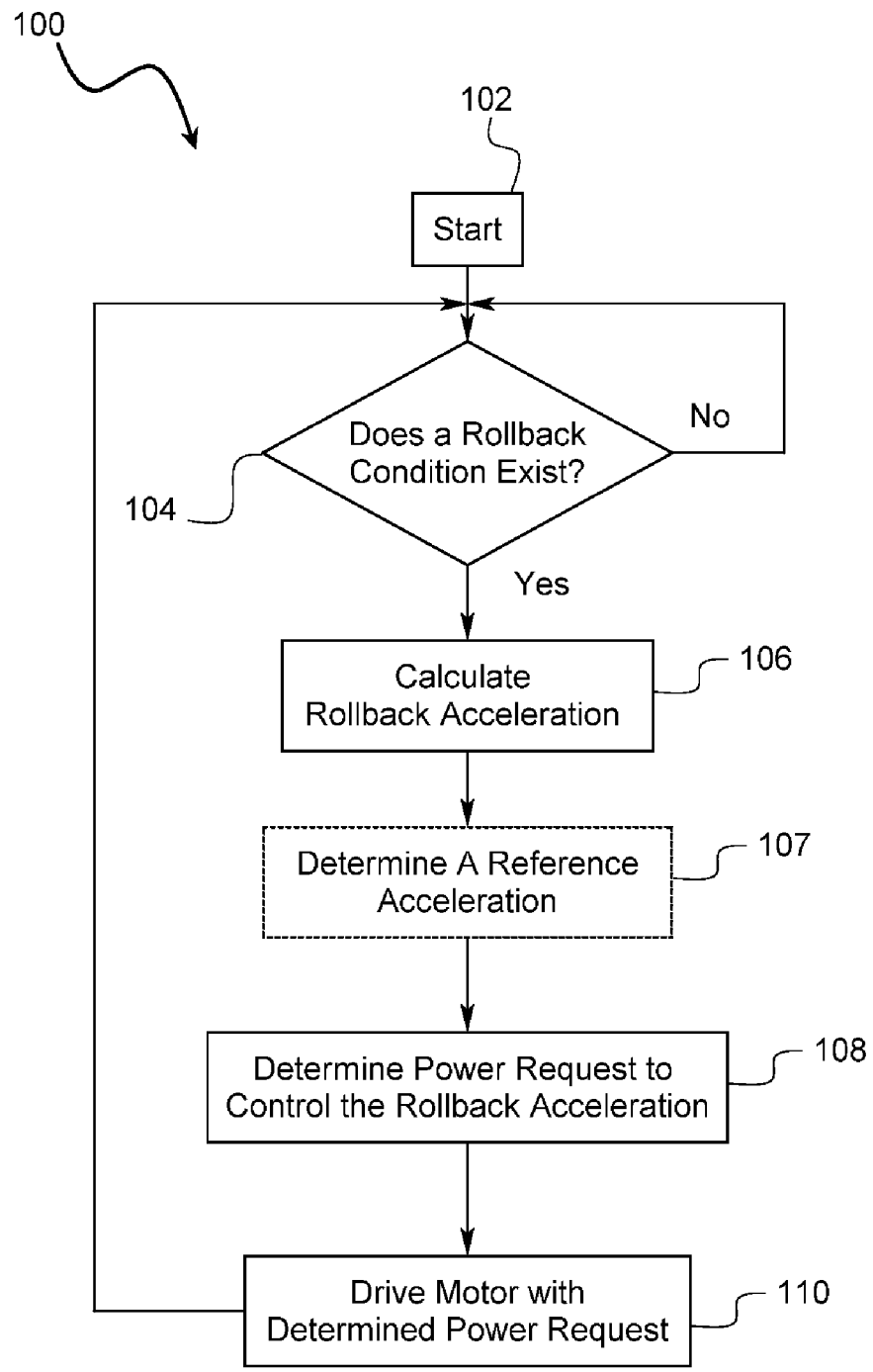
FIG. 2 depicts a flow diagram of a method for controlling hill rollback of an electric vehicle according to one embodiment described herein.
Figure 3:
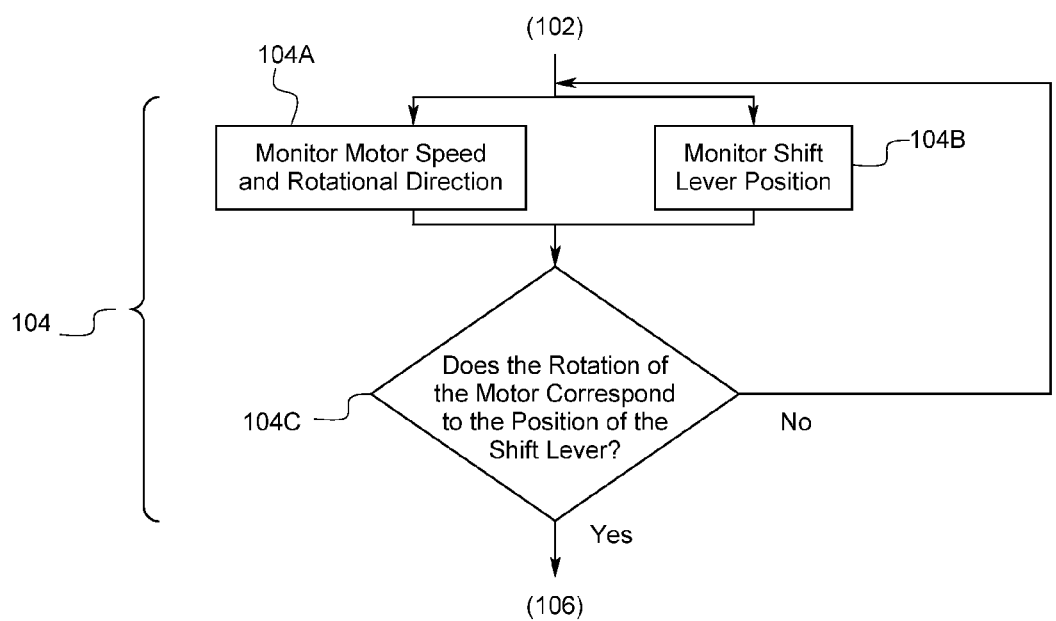
FIG. 3 depicts a flow diagram of a method for determining if rollback is occurring according to one embodiment described herein.
Figure 4:
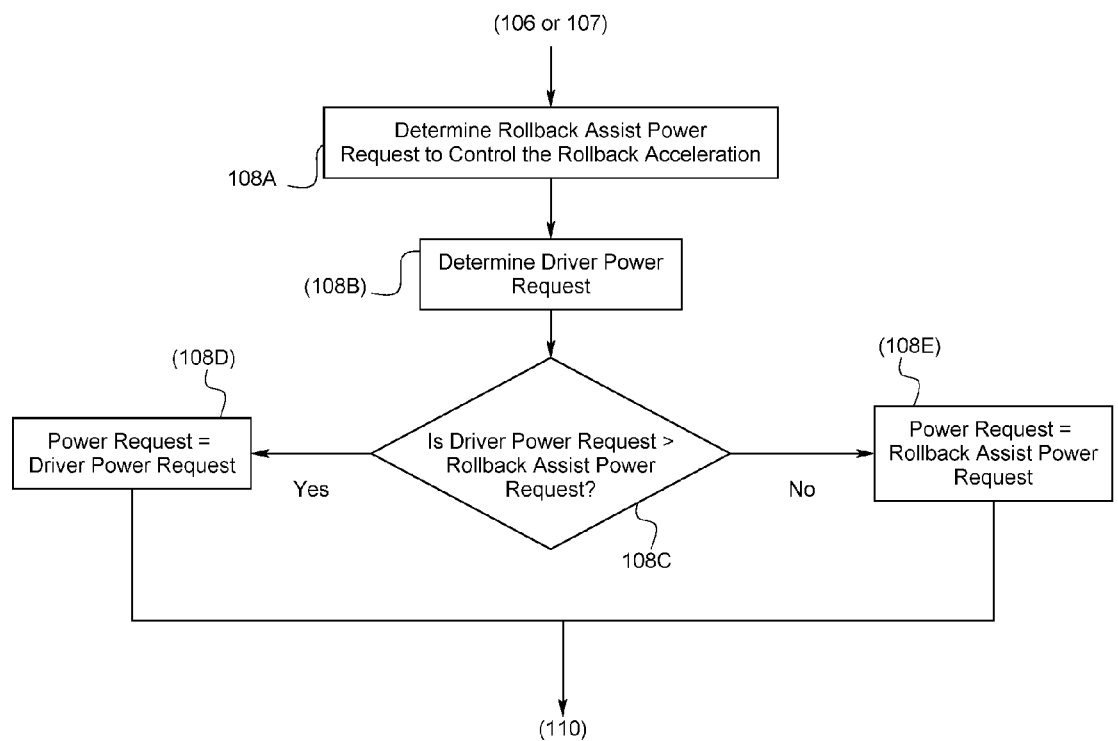
FIG. 4 depicts a flow diagram of a method for determining a power request to control the rollback acceleration of the electric vehicle according to one embodiment described herein.

Referring now to FIGS. 2-4, a flow diagram of a method 100 for dynamically controlling hill rollback of an electric vehicle is depicted. The method 100 may regulate hill rollback by detecting when rollback is occurring, determining a power request to control the rollback, and selectively applying the determined power request to the electric motor thereby driving the electric motor with the determined power request. In determining the power request the method may take into account the rollback acceleration of the vehicle such that the determined power request is sufficient to control the rollback acceleration.

The method 100 may be included as a logic loop in a vehicle controller such as the ECU 12 depicted in FIG. 1. The method 100 may be triggered when the vehicle ignition is switched to the "on" position and may terminate when the vehicle ignition is switched to the "off" position. The method 100 may begin with step 102 wherein certain variables (e.g., roll back power assist request, driver power request and the like) used in the method may be initialized. In step 104 a determination may be made as to whether a rollback condition exists with respect to the vehicle. If a rollback condition exists, the method proceeds to step 106. If a rollback condition does not exist, the method loops back and step 104 is repeated.

In one embodiment, the step of determining if a rollback condition exists may be performed in several steps, such as steps 104A-104C depicted in FIG. 3. For example, determining if a rollback condition exists may include monitoring the speed and rotational direction of the motor (step 104A) and monitoring the position of the shift lever (step 104B). The speed and rotational direction of the motor may be monitored with a motor speed/position sensor operatively attached to the electric motor/generator, as described herein. The position of the shift lever may be monitored by a shift lever position sensor, also described herein. The speed and rotational direction of the motor is indicative of the actual direction of motion (forward or reverse) of the vehicle while the position of the shift lever is indicative of the intended direction of motion (forward or reverse) of the vehicle.

In step 104C the actual direction of motion of the vehicle, as determined from the rotational direction of the motor, may be compared to the intended direction of motion as indicated by the shift lever position. If the actual direction of motion of the vehicle corresponds to the intended direction of motion (e.g., the rotational direction of the motor corresponds to the position of the shift lever), a rollback condition does not exist and step 104 is repeated. However, if the actual direction of motion of the vehicle does not correspond to the intended direction of motion (e.g., the rotational direction of the motor does not correspond to the position of the shift lever), a roll back condition exists and the method proceeds to step 106.

When a rollback condition exists, the rollback acceleration of the electric vehicle may be determined in step 106. The rollback acceleration may be calculated based on the change in speed of the vehicle as determined from the change in the rotational speed of the motor which, in turn, may be determined from the motor speed/position sensor operatively attached to the motor/generator. It should be understood that, while the rollback acceleration of the vehicle is based on the rate of change of the speed of the vehicle, the rollback acceleration of the vehicle may also be indicative of the grade of the hill or incline on which the vehicle is positioned. For example, a vehicle positioned on a steep incline will generally have a greater rollback acceleration than a vehicle positioned on a more gradual incline. Accordingly, by determining the rollback acceleration of the vehicle, the method of dynamically controlling rollback in an electric vehicle described herein takes into account the grade of the hill or incline on which the vehicle is positioned.

In one embodiment, determining the rollback acceleration may include comparing the rollback acceleration to a threshold value for rollback acceleration. The threshold value for rollback acceleration may be a predetermined value corresponding to a maximum rollback acceleration for safe operation of the vehicle. In another embodiment, the threshold value for rollback acceleration may be dynamically determined based on variables such as vehicle speed, road condition, angle of vehicle inclination/declination, available braking assist and the like. According to one embodiment, if the determined rollback acceleration is greater than the threshold value, the method may proceed to the next subsequent step. If the calculated acceleration is not greater than the threshold value, the method may return to step 104 and repeat.

Following the step of determining the rollback acceleration, the method described herein may include the step 107 of determining a reference acceleration for the vehicle. The reference acceleration may be determined from the change in the speed of the vehicle, as determined from the change in the motor speed while rollback is occurring and vehicle speed. The reference acceleration may be subsequently used to determine an appropriate power request to the electric motor to control the rollback acceleration and thereby restore the acceleration of the vehicle to the reference acceleration. The method then proceeds to step 108 where a power request for the electric motor is determined such that the rollback acceleration is controlled and the reference acceleration is restored.

In step 108 a power request for the electric motor is determined such that, when the electric motor is driven with the determined power request, the rollback of the vehicle is controlled. In one embodiment, the power request may be determined based on the rollback acceleration, the reference acceleration, and the speed of the vehicle (e.g., the speed of the electric motor). For example, in one embodiment, the power request may be determined from a look-up table (LUT) of various pre-determined power requests corresponding to various combinations of rollback acceleration and motor speed. When the method of controlling hill rollback is performed by a controller or ECU, the LUT may be stored in the memory of the controller or ECU. In another embodiment, the power request may be determined by calculating the power request using the rollback acceleration and the speed of the electric motor. In yet another embodiment, the power request may be determined to be sufficient to counteract the rollback acceleration and reduce the speed of the vehicle in the rollback direction to at least zero.

In another embodiment, the power request may be determined based on the rollback acceleration, the speed of the electric motor, and the reference acceleration such that the acceleration of the vehicle is restored to the reference acceleration. This may include calculating the power request from the rollback acceleration, the reference acceleration, and the speed of the electric motor or determining the power request from an LUT indexed according to the rollback acceleration, the reference acceleration, the motor speed and/or combinations thereof. In one embodiment proportional-integral-derivative (PID) techniques may be used in conjunction with a controller to determine the power request based on the difference between the vehicle acceleration and the reference acceleration.

In another embodiment, determining the power request with which to drive the electric motor (step 108) may comprise steps 108A-108E, as shown in FIG. 4. In step 108A a rollback assist power request is determined to control the rollback of the vehicle. The rollback assist power request may be determined as discussed hereinabove with respect to the power request (e.g., based on the rollback acceleration, the speed of the electric motor, the reference acceleration, and/or combinations thereof).

In a next step (108B) a driver power request may be determined. The driver power request occurs when the driver depresses the accelerator pedal of the vehicle to cause the vehicle to accelerate in either the forward or reverse direction. The amount which the accelerator pedal is depressed may be used to interpolate the amount of acceleration the driver desires and, thereafter, determine a driver power request which, in turn, will be used to drive the electric motor thereby producing the desired acceleration. In one embodiment, the position of the accelerator pedal, and therefore the driver power request, may be determined based on a signal from the accelerator position sensor operatively attached to the accelerator pedal and received by the ECU. When a rollback condition is present, such as in step 108B, the driver power request may be indicative of an attempt by the driver to counteract vehicle rollback by accelerating the vehicle in a direction opposite the direction of rollback.

In step 108C the rollback assist power request is compared to the driver power request to determine which of the two power requests will be sufficient to control the rollback. When the driver power request is greater than the rollback assist power request, the power request is set to the driver power request in step 108D and the method proceeds to step 110. When the rollback assist power request is greater than the driver power request, the power request is set to the rollback assist power request in step 108E and the method proceeds to step 110.

In another embodiment, when the rollback assist power request is greater than the driver power request, the driver power request may be augmented or increased by the difference between the rollback assist power request and the driver power request. The power request is then set to the augmented driver power request and the method proceeds to step 110.

Thereafter, in step 110 the power request determined in step 108 is used to drive the electric motor to control the rollback of the vehicle. In one embodiment, the application of the power request control the rollback acceleration of the vehicle and restores the acceleration of the vehicle to the reference acceleration. For example, in this embodiment, the applied power request may stop the movement of a vehicle rolling backwards down a hill and accelerate the vehicle up the hill at the reference acceleration. In another embodiment, the application of the power request counteracts the rollback acceleration of the vehicle by accelerating the vehicle in the direction opposite the rollback of the vehicle. For example, in this embodiment, the applied power request may stop the vehicle from rolling backwards down a hill and, thereafter, cause the vehicle to accelerate forwards, up the hill. In yet another embodiment, the application of the power request counteracts the rollback acceleration of the vehicle by causing the speed of the vehicle to go to zero thereby mitigating rollback. For example, in this embodiment, when a vehicle is rolling backwards down a hill, the applied power request may cause the backwards movement of the vehicle down the hill to cease, bringing the vehicle to rest on the hill. Thereafter, the driver may choose to initiate a driver power request to accelerate the vehicle up the hill. After the power request is applied to drive the electric motor, the method loops back to step 104 and the method is repeated.

It should now be understood that the methods and systems shown and described herein may be used in conjunction with electrically powered vehicles to control hill rollback such as when a vehicle is ascending an incline with the shift lever in drive or another position for providing forward motion to the vehicle. Moreover, it should also be understood that the systems and methods shown and described take into account the grade of the incline which the vehicle is ascending in dynamically controlling rollback. It should also be understood that the methods and systems described herein may be equally applicable to control hill roll-forward, such as when an electric vehicle is ascending an incline in reverse. The methods and systems described herein may be easily incorporated into current vehicle designs using existing hardware and sensors already present in the vehicles. Accordingly, the methods and systems described herein may be introduced into vehicles without significant additional expense or effort.

Moreover, the methods and systems shown and described herein provide a software-based solution to controlling electric vehicle hill rollback that may be used in conjunction with existing hill rollback prevention techniques or in place of such techniques. The methods and systems are capable of controlling electric vehicle hill rollback without user input or control. Accordingly, the risk of operator error is avoided. Further, because the methods and systems are implemented through a continuous software loop, the system response is both fast and automatic resulting in safer and more convenient vehicle operation on hills and grades.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A method for dynamically controlling rollback in an electric vehicle including an electric motor for providing motive power to the electric vehicle, the electric motor rotatable in opposite directions corresponding to the forward or reverse motion of the vehicle, and a shift lever for selecting either forward or reverse motion of the vehicle, the method comprising:
   determining if a rollback condition exists;
   calculating a rollback acceleration of the vehicle when a rollback condition exists;
   determining a power request to control the rollback of the vehicle;
   driving the electric motor using the determined power request
   determining a rollback power assist request to control the rollback of the vehicle;
   determining a driver power request; and
   comparing the driver power request to the rollback power request and, when the driver power request is greater than the rollback assist power request, setting the power request equal to the driver power request or, when the driver power request is not greater than the rollback power request, setting the power request to the rollback assist power request.

2. The method of claim 1 wherein a rollback condition exists when a direction of motion indicated by the shift lever is opposite a direction of motion of the vehicle corresponding to a direction of rotation of the electric motor.

3. The method of claim 1 wherein the rollback acceleration is calculated based on a change in speed of the electric motor.

4. The method of claim 1 wherein the power request is determined based on a speed of the electric motor and the rollback acceleration.

5. The method of claim 1 wherein the power request is determined from a look-up table comprising various predetermined power requests corresponding to various combinations of rollback acceleration and motor speed.

6. The method of claim 1 further comprising the step of determining a reference acceleration prior to determining the power request.

7. The method of claim 6 wherein the power request is determined based on a speed of the vehicle, the rollback acceleration, and the reference acceleration.

8. A method for dynamically controlling rollback in an electric vehicle including an electric motor for providing motive power to the electric vehicle, the electric motor rotatable in opposite directions corresponding to forward or reverse motion of the vehicle, an accelerator pedal for providing a driver power request to the motor, and a shift lever for selecting either forward or reverse motion of the vehicle, the method comprising:
   determining if the electric vehicle is moving in the same direction as a direction of motion indicated by the shift lever;
   calculating a rollback acceleration of the vehicle when the vehicle is moving in a direction opposite the direction of motion indicated by the shift lever;
   determining a rollback power assist request to control the rollback acceleration of the vehicle;
   determining a driver power request based on a position of the accelerator pedal; and
   driving the electric motor with the greater of the rollback power assist request and the driver power request.

9. The method of claim 8 wherein, to determine if the vehicle is moving in the same direction as the direction of motion indicated by the shift lever, a position of the shift lever is compared to a rotational direction of the electric motor.

10. The method of claim 8 wherein the rollback acceleration is calculated based on a change in speed of the electric motor.

11. The method of claim 8 further comprising determining a reference acceleration prior to determining the rollback assist power request.

12. The method of claim 11 wherein the rollback assist power request is determined such that an acceleration of the electric vehicle is maintained at or is returned to the reference acceleration.

13. The method of claim 8 wherein the rollback assist power request is determined from a look-up table comprising various predetermined power requests corresponding to various combinations of rollback acceleration and motor speed.

14. A control system for dynamically controlling rollback of an electric vehicle including an electric motor for providing motive power to the electric vehicle, the electric motor rotatable in opposite directions corresponding to the forward or reverse motion of the vehicle, an accelerator pedal for providing a driver power request to the electric motor, and a shift lever for selecting either forward or reverse motion of the electric vehicle, the control system comprising:
- a motor speed/position sensor operatively connected to the electric motor wherein the motor speed/position sensor outputs a signal indicative of the speed and/or position of the motor;
- an accelerator pedal position sensor operatively connected to the accelerator pedal;
- a shift lever position sensor operatively connected to the shift lever; and
- a controller, wherein the controller is operatively connected to the electric motor, the motor speed/position sensor, the accelerator position sensor, and the shift lever position sensor such that the controller receives signals from the motor speed/position sensor, the accelerator position sensor, and the brake lever position sensor, and wherein the controller is programmed to:
  - cooperate with the motor speed/position sensor and the shift lever position sensor to determine if rollback is occurring;
  - cooperate with the motor speed/position sensor to determine a rollback acceleration of the electric vehicle;
  - determine a rollback assist power request for the electric motor to control the rollback acceleration;
  - cooperate with the accelerator pedal position sensor to determine a driver power request; and
  - drive the electric motor with the greater of the rollback assist power request and the driver power request thereby dynamically controlling the rollback.

15. The system of claim 14 wherein rollback occurs when a direction of motion of the electric vehicle indicated by the motor speed/position sensor is opposite a direction indicated by the shift lever position sensor.

16. The system of claim 14 wherein the rollback assist power request is determined based on the rollback acceleration and a speed of the electric motor.

17. The system of claim 14 wherein the rollback assist power request is determined from a look-up table comprising various predetermined power requests corresponding to various combinations of rollback acceleration and motor speed stored in a memory of the controller.

18. The system of claim 14 wherein the controller is further programmed to cooperate with the motor speed/position sensor to determine a reference acceleration.

19. The system of claim 18 wherein the rollback assist power request is determined based on the reference acceleration, the rollback acceleration, and a speed of the electric motor.

* * * * *